US011521065B2

(12) United States Patent
Reddy et al.

(10) Patent No.: US 11,521,065 B2
(45) Date of Patent: Dec. 6, 2022

(54) GENERATING EXPLANATIONS FOR CONTEXT AWARE SEQUENCE-TO-SEQUENCE MODELS

(71) Applicant: International Business Machines Corporation, Armonk, NY (US)

(72) Inventors: Rachamalla Anirudh Reddy, Warangal (IN); Pranay Kumar Lohia, Bhagalpur (IN); Samiulla Zakir Hussain Shaikh, Bangalore (IN); Diptikalyan Saha, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 16/783,534

(22) Filed: Feb. 6, 2020

(65) Prior Publication Data

US 2021/0248455 A1 Aug. 12, 2021

(51) Int. Cl.
*G06N 3/08* (2006.01)
*G06N 3/04* (2006.01)
*G06F 16/2457* (2019.01)

(52) U.S. Cl.
CPC ......... *G06N 3/08* (2013.01); *G06F 16/24575* (2019.01); *G06N 3/0445* (2013.01); *G06N 3/0454* (2013.01)

(58) Field of Classification Search
CPC ...... G06N 3/08; G06N 3/0454; G06N 3/0445; G06F 16/24575
See application file for complete search history.

(56) References Cited

U.S. PATENT DOCUMENTS

| 10,418,032 B1* | 9/2019 | Mohajer ............. G10L 15/1815 |
| 11,106,690 B1* | 8/2021 | Dhillon .................. G06N 5/003 |
| 2011/0131157 A1* | 6/2011 | Iyer ..................... G06Q 30/0251 707/706 |

(Continued)

OTHER PUBLICATIONS

Alvarez-Melis, David et al. Jaakkola TS. A causal framework for explaining the predictions of black-box sequence-to-sequence models. arXiv preprint arXiv:1707.01943. Jul. 6, 2017.

(Continued)

*Primary Examiner* — Etienne P Leroux
(74) *Attorney, Agent, or Firm* — Ryan, Mason & Lewis, LLP

(57) ABSTRACT

Methods, systems, and computer program products for generating explanations for a semantic parser are provided herein. A computer-implemented method includes providing to a generative model (i) at least one query and (ii) a context of at least one dataset applicable to the at least one query, wherein the generative model generates a plurality of perturbations for the at least one input query based on the context; providing the plurality of perturbations as inputs to a context aware sequence-to-sequence model, thereby obtaining a plurality of outputs; and generating, for (i) an additional query provided as input to the context aware sequence-to-sequence model and (ii) a context applicable to the additional query, an explanation indicative of one or more parts of the additional query that contributes to an output corresponding to the additional query, based at least in part on the plurality of outputs corresponding to the perturbations.

20 Claims, 7 Drawing Sheets

(56) References Cited

U.S. PATENT DOCUMENTS

| | | |
|---|---|---|
| 2019/0236134 A1 | 8/2019 | Galitsky |
| 2020/0301925 A1* | 9/2020 | Zhong ............... G06F 16/24522 |
| 2021/0103606 A1* | 4/2021 | Malhotra ............ G06F 16/9535 |
| 2021/0124999 A1* | 4/2021 | Dia .......................... G06N 3/08 |
| 2022/0067557 A1* | 3/2022 | Donaldson ............. G06N 5/045 |

OTHER PUBLICATIONS

Tulio Ribeiro, Marco, et al., "Why Should I Trust You?": Explaining the Predictions of Any Classifier, arXiv preprint arXiv:1602.04938, Feb. 2016.

Dong, L. et al., Confidence modeling for neural semantic parsing. arXiv preprint arXiv:1805.04604. May 11, 2018.

Alzantot M, Sharma Y, Elgohary A, Ho BJ, Srivastava M, Chang KW. Generating natural language adversarial examples. arXiv preprint arXiv:1804.07998. Apr. 21, 2018.

Kuleshov, Volodymyr, et al., Adversarial examples for natural language classification problems, May 3, 2018.

Hossain, Munshi Imran, Opening the Black Box: Moving to Explainable AI, https://www.cytel.com/blog/opening-black-box-ai, May 7, 2019.

* cited by examiner

302

- what is the highest number of artists in the year when the issue price is $ <unk>?
- what is the lowest number of wins for the team with a position of less than 4 and winnings $ 50,000?
- what is the average number of floors when the prominence ( m ) is less than <unk>, 185
- what is the lowest number of wins for quambatook when the position is less than 1?

304

- what is the lowest elevation ( m ) of the prominence ( m ) of <unk>?
- what is the average isolation ( m ) of the mount <unk> peak mount taylor?
- what is the lowest elevation ( m ) for the peak mount taylor, and elevation of m?
- what is the lowest elevation ( m ) for the peak mount taylor, with <unk> prominence ( m ) of <unk>?

FIG. 3

GENERATING EXPLANATIONS FOR CONTEXT AWARE SEQUENCE-TO-SEQUENCE MODELS

FIELD

The field generally relates to information technology and, more particularly, to generating explanations for context aware sequence-to-sequence models, such as, for example, semantic parsers.

BACKGROUND

Context aware sequence-to-sequence models are used in a variety of systems, such as, for example, question answering systems, machine translation systems, etc. A semantic parser is one type of context aware sequence-to-sequence model, which converts a natural language sentence into a logical form. Currently, semantic parsers perform well with training data but the performance on real data is generally inadequate. Additionally, the deep learning models used to build semantic parsers are highly complicated, which makes it difficult to determine why a particular error has been made.

SUMMARY

In one embodiment of the present disclosure, techniques for generating explanations for a semantic parser are provided. An exemplary computer-implemented method can include steps of providing to a generative model (i) at least one query and (ii) a context of at least one dataset applicable to the at least one query, wherein the generative model generates a plurality of perturbations for the at least one input query based on the context; providing the plurality of perturbations as inputs to a context aware sequence-to-sequence model, thereby obtaining a plurality of outputs; and generating, for (i) an additional query provided as input to the context aware sequence-to-sequence model and (ii) a context applicable to the additional query, an explanation indicative of one or more parts of the additional query that contributes to an output corresponding to the additional query, based at least in part on the plurality of outputs corresponding to the perturbations.

An example of another embodiment includes a method comprising generating, using a generative model, a plurality of perturbations of a query that is associated with at least one knowledge base, wherein the plurality of perturbations are generated based on one or more contexts associated with the query in the at least one knowledge base; inputting the plurality of perturbations to a semantic parser, thereby obtaining a corresponding set of outputs; training a machine learning model to classify the relative importance of one or more features associated with the query based on the set of outputs; and generating for at least one additional query provided as input to the semantic parser, an explanation based at least in part on the machine learning model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 shows a set of perturbations generated with context and a set of perturbations generated without context;

DETAILED DESCRIPTION

As noted herein, context aware sequence-to-sequence models (such as, for example, semantic parsers) tend to fail when provided with real data, and it is often difficult to know why a particular error occurred due to the complexity of the deep learning models that are used to build them.

Some existing techniques related to these issues generate explanations using graph algorithms for a sequence-to-sequence system in a model agnostic way. These techniques use variational autoencoders (VAE) to generate perturbations and provide explanations without considering any contextual clues. The generated perturbations are diverse and do not focus on the context of the given input. The term "context" (as it relates to an input) is used herein to refer to a source of knowledge on which the input query can yield a result. For semantic parsers, the context is generally in the form of a table schema; however, the context may be any knowledge source in a digital format (such as, for example, a NoSQL DB document in JSON format, a plain text file, etc.). Other techniques include generating rule-based perturbations to provide explanations for classification problems. For example, perturbations in natural language text are generated by removing words from an input sentence selected at random. These types of perturbations are not good candidates for probing complex systems, such as semantic parsers.

According to some exemplary embodiments of the disclosure, contextual clues (such as a table schema, for example) are used to condition perturbations so that they are less diverse and more related to an input sentence. In some exemplary embodiments, perturbations are generated by bringing contextual awareness to generators (such as VAE or generative adversarial network (GANs), for example), which generate extremely fluent and meaningful sentences. Infusing the context into this process ensures that the generated perturbations are relevant to the context defined by the knowledge base associated with the input-output pair being analyzed.

Figure 1:
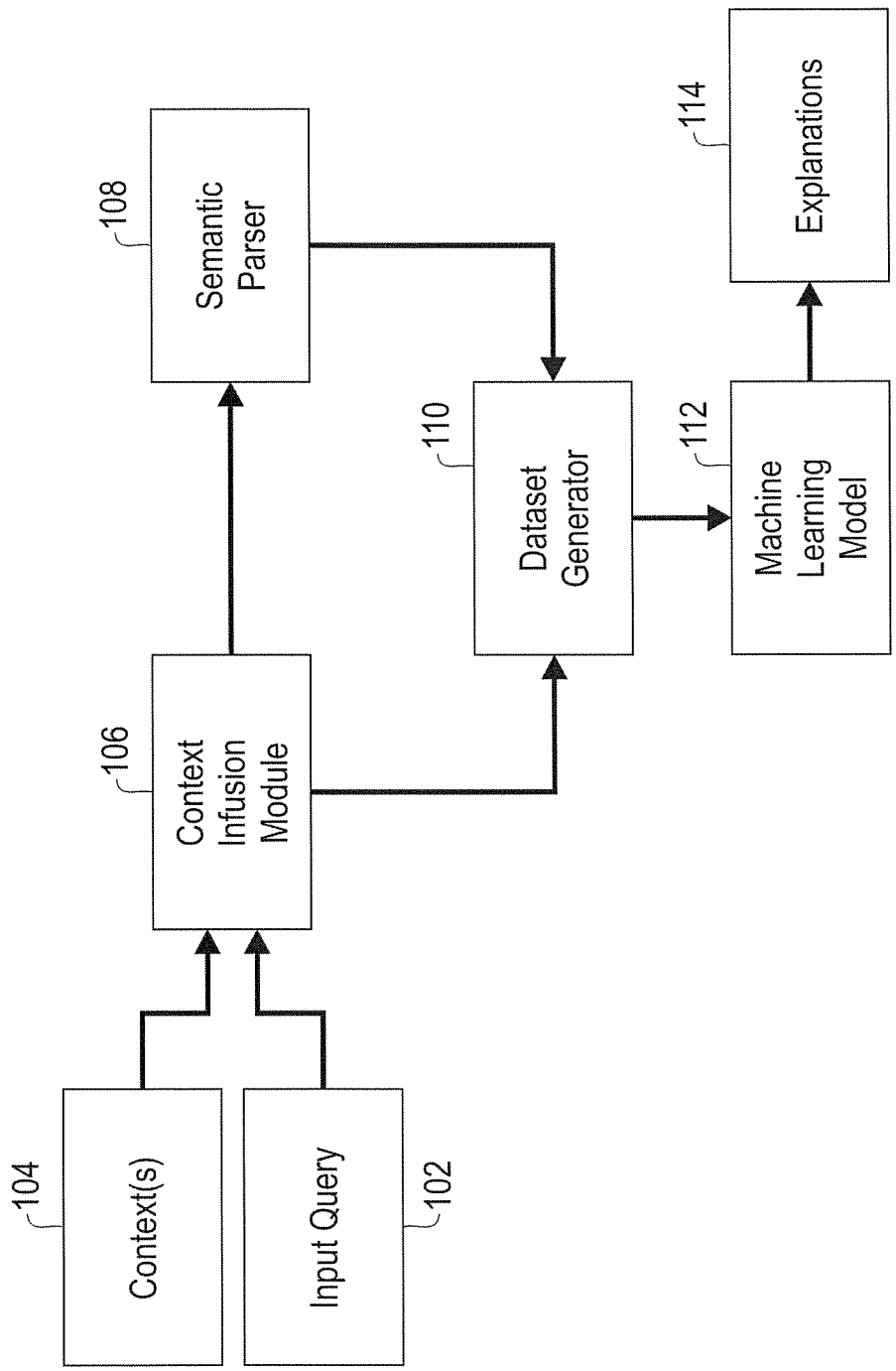
FIG. 1 is a diagram illustrating a system architecture, according to an exemplary embodiment of the disclosure.

Referring now to FIG. 1, this figure is a diagram illustrating a system architecture according to an illustrative embodiment. FIG. 1 depicts a context infusion module 106 that obtains an input query 102 and one or more contexts 104 as inputs. The context infusion module 106 uses the inputs 102, 104 to generate perturbations of the input query 102 that are related to the context 104. As described in more detail herein, the context 104 may comprise, for example, a table schema of one or more target knowledge bases related to the input query 102.

In the FIG. 1 embodiment, the perturbations generated by context infusion module 106 are provided as input to a semantic parser 108. The dataset generator 110 generates a binary features dataset based on the output of the semantic parser 108 and the perturbations, which is used to train the machine learning model 112. The binary features dataset may, for example, capture the change in the output of the semantic parser 108 subject to the perturbations related to the context 104, as discussed in more detail herein. Training the machine learning model 112 with the binary features dataset allows the machine learning model 112 to learn the importance of various features in the dataset. Accordingly, the machine learning model 112 may be used to generate explanations 114 that identify one or more parts of a given input provided to the semantic parser 108 that contributed to the corresponding output. In at least one example embodiment, the machine learning model 112 may comprise a logistic regression classifier.

As an example, assume an input query corresponds to the following natural language query: "What is the sum of Kilometers that has a Station Code of KGQ?" For this example, the semantic parser output may be "SELECT SUM(KILOMETERS) FROM TABLE WHERE Station Code=KGQ". Also, assume the target knowledge base includes the following context: ["Station Code", "Station", "Arrival", "Departure", "Kilometers"]. If the context of the database is not considered (e.g., perturbations are selected at random), then an explanation for the output may be: {KILOMETERS: "kilometers", SUM: "has a", Station Code: "a Station Code"}. By considering the context of the target knowledge base, an improved explanation can be generated such as, for example: {KILOMETERS: "kilometers", SUM: "the sum", Station Code: "a Station Code"}.

Figure 2:
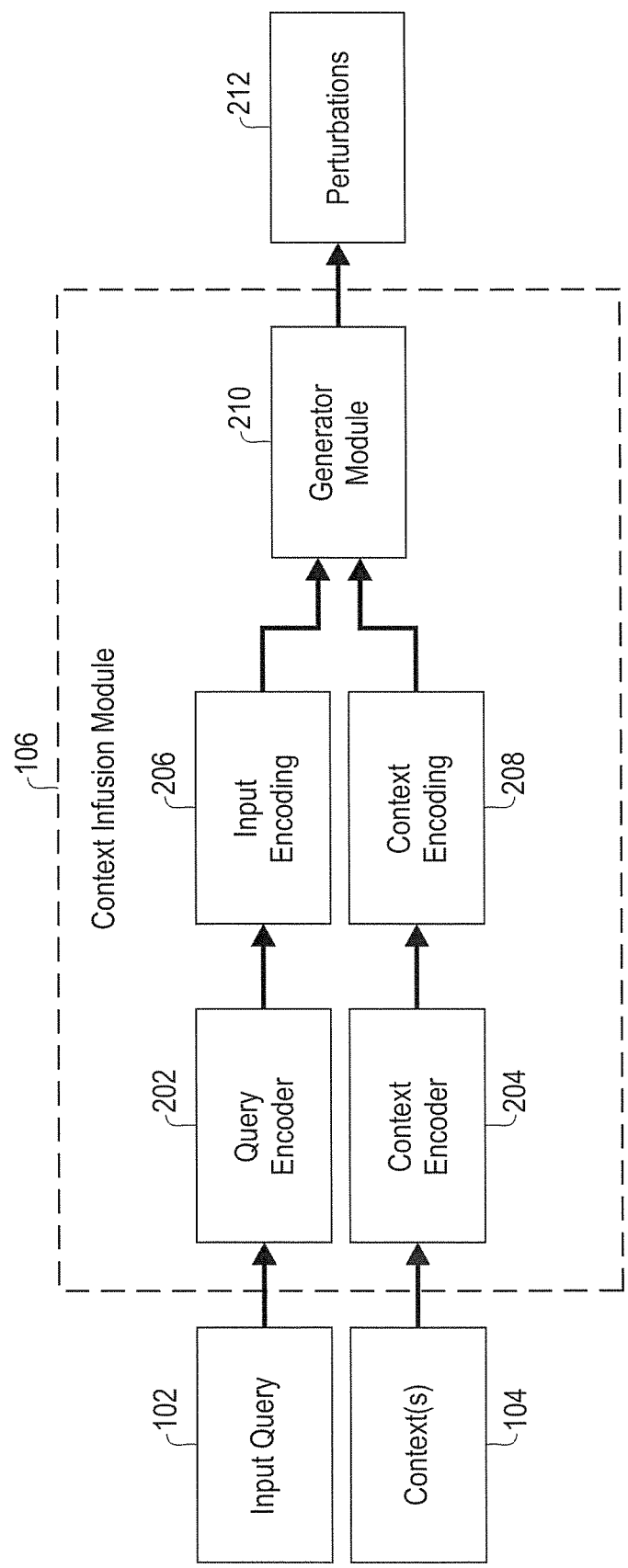
FIG. 2 is a diagram illustrating techniques for generating perturbations in accordance with an exemplary embodiment.

FIG. 2 is a diagram illustrating techniques for generating perturbations in accordance with an exemplary embodiment. In the FIG. 2 embodiment, the context infusion module 106 includes a query encoder 202 that generates an input encoding 206 for input query 102, and a context encoder 204 that generated a context encoding 208 for the one or more contexts 104. For example, the encoders 202, 204 may comprise a Long Short-Term Memory (LSTM) model. The context infusions module 106 also includes a generator module 210, which may comprise, for example, a Conditional VAE or a GAN. The generator module 210 generates one or more perturbations 212 by perturbing the input query 102 relevant to the one or more contexts 104.

It is noted that the context may be a list of multiple knowledge sources. In typical training data sets for semantic parsing (such as wikiSql, for example), exactly one table is associated with each input query.

One or more exemplary embodiments include training a ground truth for a perturbation generation model (such as for example, generator module 210). The training may include obtaining training data for a semantic parser in the form of one or more inputs (e.g., sentences or phrases) and one or more contexts (e.g., one or more tables). The training includes finding for each context, $C_i$, and for each input, $S_j$, the k most similar inputs in the training data related to $S_j$ having context, $C_i$, denoted as $S_{j1}$, $S_{j2}$, . . . , $S_{jk}$. Next, k training pairs are generated as follows: $(S_j|C_i) \rightarrow S_{j1}$, $(S_j|C_i) \rightarrow S_{j2}$, . . . , $(S_j|C_i) \rightarrow S_{jk}$. A training cycle is then performed for each of the input pairs to obtain the ground truth of the perturbation generation model.

Referring now to FIG. 3, this figure shows a set of perturbations generated without context 302 and a set of perturbations generated with context 304. The set 304 was generated in accordance with one or more exemplary embodiments. The perturbations in each set 302, 304 were both generated for the following input query: "What is the lowest elevation (m) for the peak Mount Taylor?" The context considered when generating set 304 was a relational database table having the following name: Prominent summits of New Zealand. The table schema was: "Rank", "Peak", "Country", "Island", "Elevation (m)", "Prominence (m)", "Col (m)". As can be seen, the perturbations in the set 302 are diverse and less focused on the target knowledge base (e.g., perturbations in the set 302 include terms that are not relevant to the context, such as: artists, teams, winnings, etc. The perturbations in the set 304 are more focused and more relevant to the initial input query, and thus more useful for probing complex systems such as a semantic parser, for example.

According to at least one illustrative embodiment, the binary features dataset is created by finding n-grams for the original input query. For example, the process may include finding all the unigrams, bigrams, trigrams, four-grams, five-grams for the original input query. The binary features dataset may include binary vectors for the different features. Each feature of a given binary vector indicates the presence or absence of a particular unigram/bigram/trigram/four-gram/pentagram.

One or more embodiments include labeling explanations for outputs of the semantic parser. For example, for predictions that are correct, a given perturbation is assigned a first label (e.g., '1') if the output generated for the given perturbation is the same as the output of the original query; otherwise the given perturbation is assigned a second label (e.g., '0'). For predictions that are incorrect, the second label (e.g., '0') is assigned to a given perturbation if the output of that perturbation is similar to the ground truth. Otherwise, the first label (e.g., '1') is assigned to a given perturbation if the output is the same as the wrong output of the original query. The assigned labels can then be used to explain the correct and incorrect predictions.

According to one or more exemplary embodiments, a logistic regression classifier may then be trained using the binary features dataset, wherein the weights of the logistic regression classifier that are learned during training indicate the importance of the various features.

Figure 4:
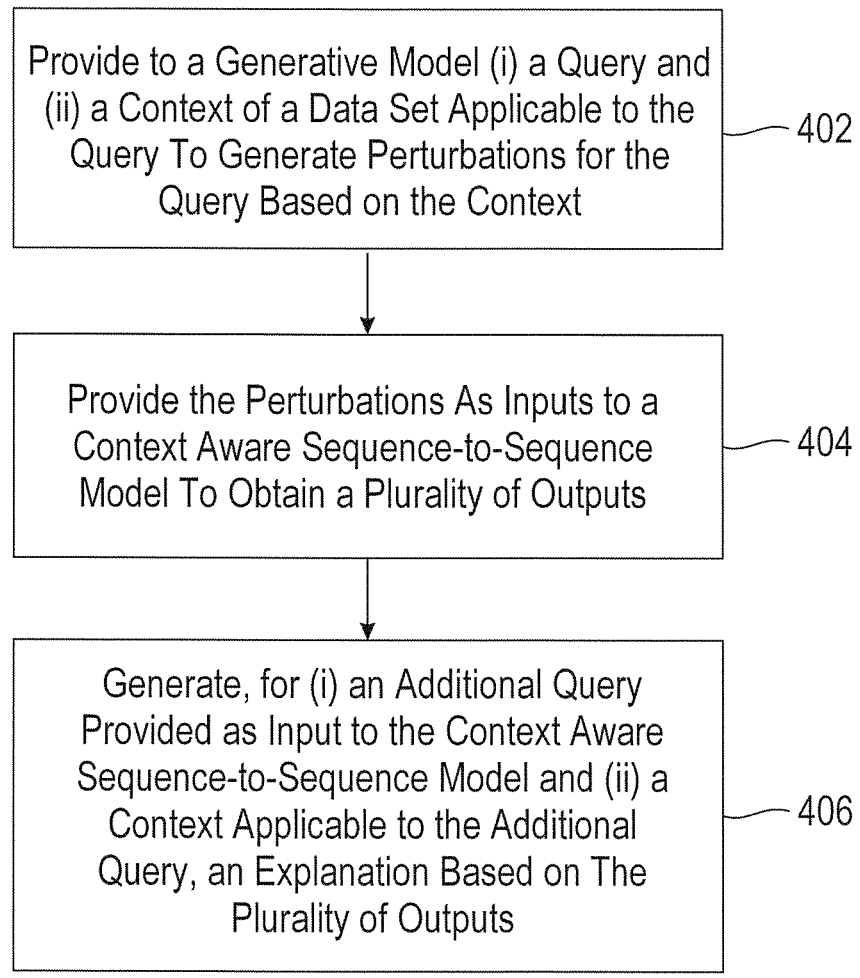
FIG. 4 is a flow diagram illustrating techniques according to an exemplary embodiment.

FIG. 4 is a flow diagram illustrating techniques according to an embodiment of the present invention. Step 402 includes providing to a generative model (i) at least one query and (ii) a context of at least one dataset applicable to the at least one query, wherein the generative model generates a plurality of perturbations for the at least one input query based on the context. Step 404 includes providing the plurality of perturbations as inputs to a context aware sequence-to-sequence model, thereby obtaining a plurality of outputs. Step 406 includes generating, for (i) an additional query provided as input to the context aware sequence-to-sequence model and (ii) a context applicable to the additional query, an explanation indicative of one or more parts of the additional query that contributes to an output corresponding to the additional query, based at least in part on the plurality of outputs corresponding to the perturbations.

The techniques in FIG. 4 may include a step of generating a binary features dataset based on the plurality of outputs corresponding to the perturbations, wherein each item in the binary features dataset indicates a change in one or more features of a given one of the perturbations relative to the at least one query; and training a machine learning model, using the binary features dataset, to classify a relative importance of the one or more features. The techniques may also include a step of using the trained machine learning model to generate the explanation. The machine learning model may include a logistic regression classifier. Generating the binary features dataset may include identifying one or more n-grams of the at least one query. The techniques may include a step of debugging the context aware sequence-to-sequence model based at least in part on the generated explanation. The at least one query may include a natural language query. The context applicable to the at least one query may correspond to a relational database table. The techniques may include a step of encoding, using a long short-term memory model, one or more of (i) the context applicable to the at least one query and (ii) the at least one query. The generative model may include one or more of: (i) a generative adversarial network and (ii) a VAE. The context aware sequence-to-sequence model may include a semantic parser.

Another example embodiment of a method includes generating, using a generative model, a plurality of perturbations of a query that is associated with at least one knowledge base, wherein the plurality of perturbations are generated based on one or more contexts associated with the query in the at least one knowledge base; inputting the plurality of perturbations to a semantic parser, thereby obtaining a corresponding set of outputs; training a machine learning model to classify the relative importance of one or more features associated with the query based on the set of outputs; and generating for at least one additional query provided as input to the semantic parser, an explanation based at least in part on the machine learning model.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
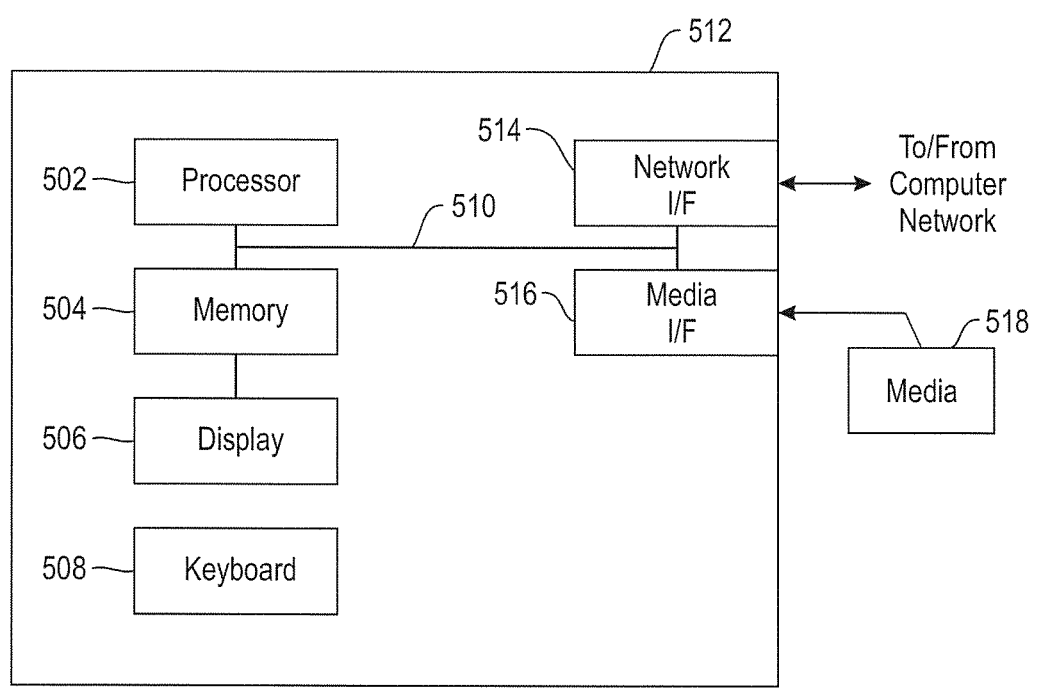
FIG. 5 is a system diagram of an exemplary computer system on which at least one embodiment of the disclosure can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
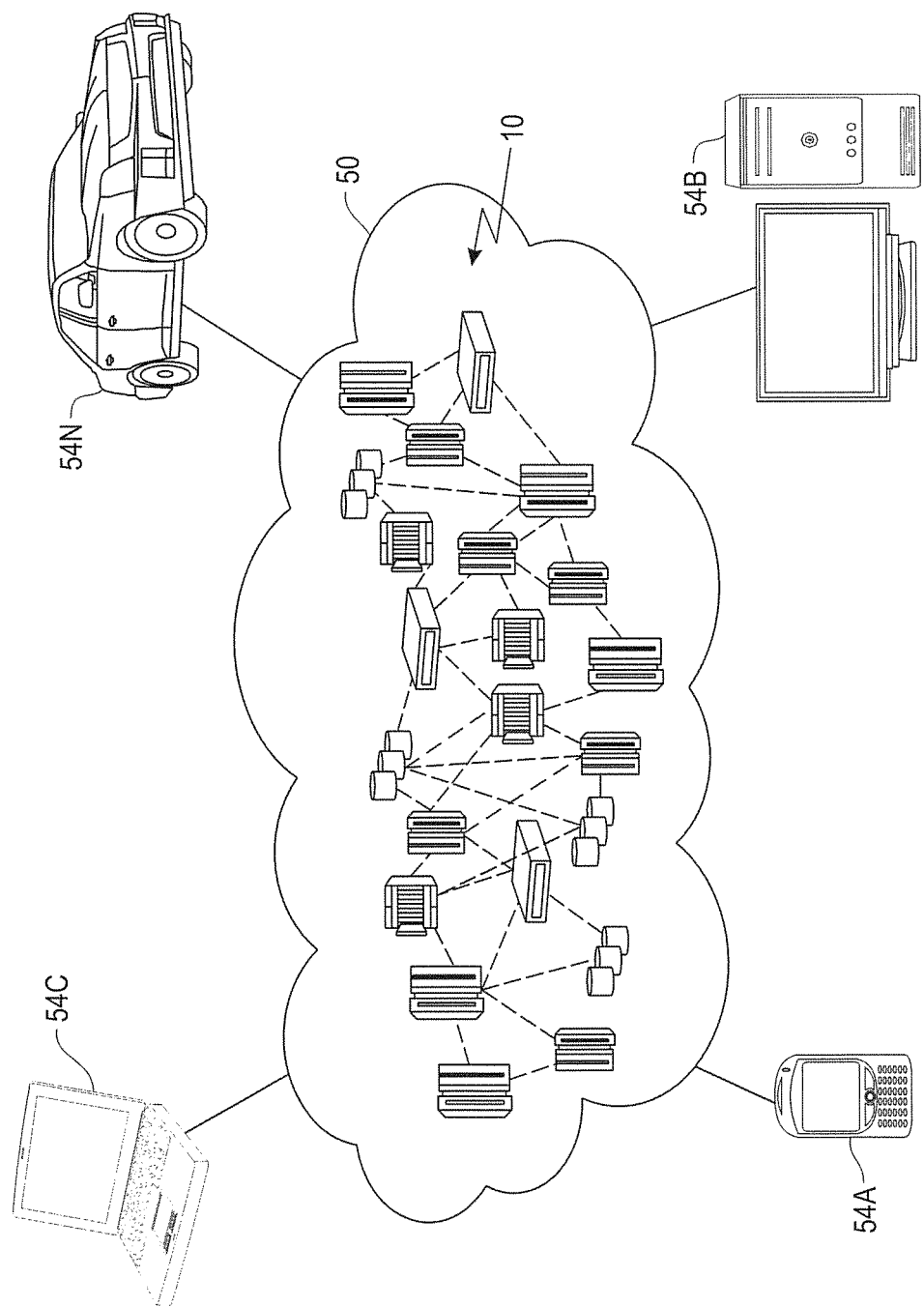
FIG. 6 depicts a cloud computing environment according to an exemplary embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
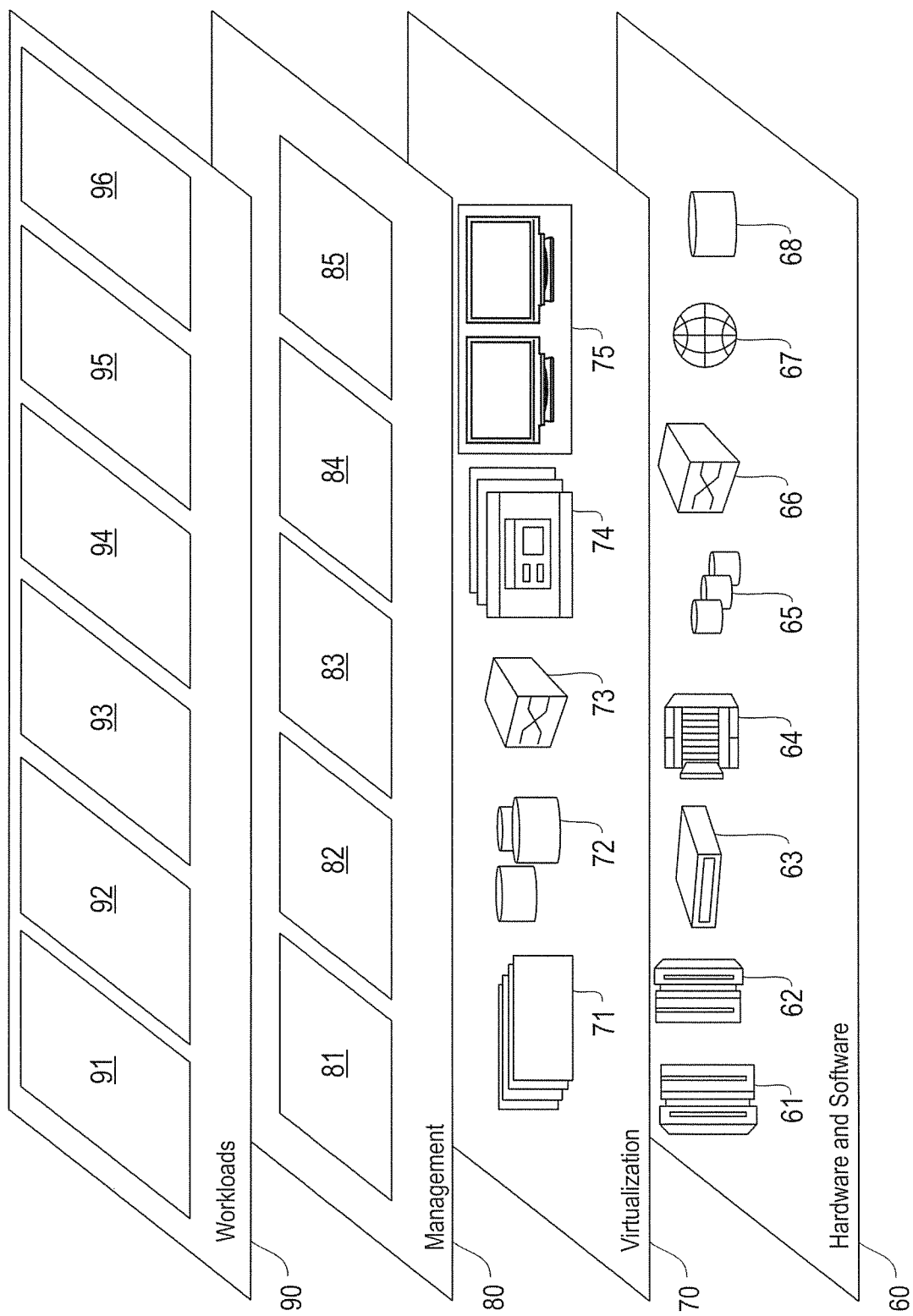
FIG. 7 depicts abstraction model layers according to an exemplary embodiment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of explanations for a semantic parser 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a beneficial effect of one or more of the example embodiments disclosed herein is improving quality of perturbations for a semantic parser, which in turn improves the quality of explanations of the decision making process of semantic parsers. Another beneficial effect of one or more of the example embodiments disclosed herein is improving the speed of the explanation generation process as only a small number of perturbations are needed to give a confident explanation as the perturbations are generated based on the context. Yet another beneficial effect of one or more of the example embodiments disclosed herein is providing improved tools for gaining insights and debugging complex models, such as, for example, semantic parsers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
providing, to a first model, at least one query and a context of at least one first dataset applicable to the at least one query, wherein the first model generates a plurality of perturbations for the at least one input query based on the context;
providing the plurality of perturbations as inputs to a second model, thereby obtaining a plurality of outputs; and
generating, for an additional query provided as input to the second model and a context applicable to the additional query, an explanation indicative of one or more parts of the additional query that contributes to an output corresponding to the additional query, based at least in part on the plurality of outputs corresponding to the perturbations, wherein the explanation is generated at least in part by using a third model that is trained on a second dataset, wherein the second dataset is generated based on the plurality of outputs corresponding to the perturbations and each item in the second dataset indicates a change in one or more features of a given one of the perturbations relative to the at least one query;
wherein the method is carried out by at least one computing device.

2. The computer-implemented method of claim 1, comprising:
training the third model, using the dataset, to classify a relative importance of the one or more features, wherein the second dataset comprises a binary features dataset.

3. The computer-implemented method of claim 2, wherein the third model comprises a logistic regression classifier.

4. The computer-implemented method of claim 2, wherein the second dataset is generated at least in part by identifying one or more n-grams of the at least one query.

5. The computer-implemented method of claim 1, comprising:
debugging the second model based at least in part on the generated explanation.

6. The computer-implemented method of claim 1, wherein the at least one query comprises a natural language query.

7. The computer-implemented method of claim 1, wherein the context applicable to the at least one query corresponds to a relational database table.

8. The computer-implemented method of claim 1, comprising:
encoding, using a long short-term memory model, one or more of the context applicable to the at least one query and the at least one query.

9. The computer-implemented method of claim 1, wherein the first model comprises one or more of a generative adversarial network and a variational autoencoder.

10. The computer-implemented method of claim 1, wherein the second model comprises a semantic parser.

11. A computer program product comprising a computer readable storage medium having program instructions embodied therewith, the program instructions executable by a computing device to cause the computing device to:
provide, to a first model, at least one query and a context of at least one first dataset applicable to the at least one query, wherein the first model generates a plurality of perturbations for the at least one input query based on the context;
provide the plurality of perturbations as inputs to a second model, thereby obtaining a plurality of outputs; and
generate, for an additional query provided as input to the second model and (ii) a context applicable to the additional query, an explanation indicative of one or more parts of the additional query that contributes to an output corresponding to the additional query, based at least in part on the plurality of outputs corresponding to the perturbations, wherein the explanation is generated at least in part by using a third model that is trained on a second dataset, wherein the second dataset is generated based on the plurality of outputs corresponding to the perturbations and each item in the second dataset indicates a change in one or more features of a given one of the perturbations relative to the at least one query.

12. The computer program product of claim 11, wherein the program instructions executable by a computing device further cause the computing device to:
train the third model, using the second dataset, to classify a relative importance of the one or more features, wherein the second dataset comprises a binary features dataset.

13. The computer program product of claim 12, wherein the third model comprises a logistic regression classifier.

14. The computer program product of claim 12, wherein the dataset is generated at least in part by identifying one or more n-grams of the at least one query.

15. The computer program product of claim 11, wherein the program instructions executable by a computing device further cause the computing device to:
debug the second model based at least in part on the generated explanation.

16. The computer program product of claim 11, wherein the program instructions executable by a computing device further cause the computing device to:
encode, using a long short-term memory model, one or more of the context applicable to the at least one query and the at least one query.

17. A system comprising:
a memory; and
at least one processor operably coupled to the memory and configured for:
providing, to a first model, at least one query and a context of at least one first dataset applicable to the at least one query, wherein the first model generates a plurality of perturbations for the at least one input query based on the context;
providing the plurality of perturbations as inputs to a second model, thereby obtaining a plurality of outputs; and
generating, for an additional query provided as input to the second model and a context applicable to the additional query, an explanation indicative of one or more parts of the additional query that contributes to an output corresponding to the additional query, based at least in part on the plurality of outputs corresponding to the perturbations, wherein the explanation is generated at least in part by using a third model that is trained on a second dataset, wherein the second dataset is generated based on the plurality of outputs corresponding to the perturbations and each item in the second dataset indicates a change in one or more features of a given one of the perturbations relative to the at least one query.

18. The system if claim 17, wherein the first model comprises one or more of a generative adversarial network and a variational autoencoder.

19. The system if claim 17, wherein the second model comprises a semantic parser.

20. A computer-implemented method, comprising:
providing, to a first model, at least one query and a context of at least one dataset applicable to the at least one query, wherein the first model generates a plurality of perturbations for the at least one input query based on the context;
providing the plurality of perturbations as inputs to a second model, thereby obtaining a plurality of outputs;
generating, for an additional query provided as input to the second model and a context applicable to the additional query, an explanation indicative of one or more parts of the additional query that contributes to an output corresponding to the additional query, based at least in part on the plurality of outputs corresponding to the perturbations; and
debugging the second model based at least in part on the generated explanation;
wherein the method is carried out by at least one computing device.

* * * * *